United States Patent
Klein-Hitpass et al.

(10) Patent No.: US 9,267,864 B2
(45) Date of Patent: Feb. 23, 2016

(54) METHOD FOR IDENTIFYING DAMAGE ON TRANSMISSIONS

(75) Inventors: Arno Klein-Hitpass, Aachen (DE); Jan-Dirk Reimers, Aachen (DE)

(73) Assignee: SIEMENS AKTIENGESELLSCHAFT, München (DE)

(*) Notice: Subject to any disclaimer, the term of this patent is extended or adjusted under 35 U.S.C. 154(b) by 410 days.

(21) Appl. No.: 13/551,121

(22) Filed: Jul. 17, 2012

(65) Prior Publication Data

US 2013/0180319 A1 Jul. 18, 2013

(30) Foreign Application Priority Data

Jul. 18, 2011 (EP) .................................... 11174330

(51) Int. Cl.
*G01M 13/02* (2006.01)

(52) U.S. Cl.
CPC .................................. *G01M 13/028* (2013.01)

(58) Field of Classification Search
USPC ........... 73/862.08, 862.31, 862.321, 862.328, 73/54.02, 593; 702/41
See application file for complete search history.

(56) References Cited

U.S. PATENT DOCUMENTS

| | | | |
|---|---|---|---|
| 3,982,419 A * | 9/1976 | Boys | 73/862.24 |
| 4,872,337 A * | 10/1989 | Watts et al. | 73/162 |
| 4,931,949 A * | 6/1990 | Hernandez et al. | 702/35 |
| 4,989,458 A | 2/1991 | Suzuki | |
| 5,042,292 A * | 8/1991 | Plint et al. | 73/54.28 |
| 5,067,355 A * | 11/1991 | Witte | 73/862.326 |
| 5,347,857 A * | 9/1994 | Mirhakimi et al. | 73/115.01 |
| 6,029,930 A * | 2/2000 | Maino et al. | 244/17.13 |
| 6,578,437 B1 | 6/2003 | Moerbe | |
| 7,640,139 B2 * | 12/2009 | Sahara et al. | 702/183 |
| 8,215,187 B2 * | 7/2012 | Chen | 73/862.21 |
| 2012/0072130 A1 * | 3/2012 | Doleschel et al. | 702/41 |

FOREIGN PATENT DOCUMENTS

| | | |
|---|---|---|
| CN | 1221081 A | 6/1999 |
| CN | 2809621 Y | 8/2006 |
| DE | 19732124 A1 | 2/1999 |
| DE | 19757317 A1 | 7/1999 |
| EP | 0889314 A2 | 1/1999 |
| JP | H02203221 A | 8/1990 |

OTHER PUBLICATIONS

Von Cj Craptree et al.: "Detecting, Incipient Wind Turbine Gearbox Failure: The Signal Analysis Method for On-Line Condition Monitoring", European Wind Energy Conference, 2010, XP002664789, * das ganze Dokument *; Others; 2010; GB.

Pan, Hongxia et al: "Condition Detection and Fault Diagnosis for Gear Transmission Systems"; Journal of North China Institute of Technology, vol. 22, No. 4; pp. 314-316; CN; Aug. 31, 2001.

* cited by examiner

*Primary Examiner* — Hezron E Williams
*Assistant Examiner* — Xin Zhong
(74) *Attorney, Agent, or Firm* — Henry M. Feiereisen LLC.

(57) ABSTRACT

A method for identifying possible damage in a toothed transmission stage having at least one pair of engagement toothed wheels includes measuring with a vibration transducer an oscillation signal corresponding to oscillations produced by a rolling and impact motion when teeth of a pair of the toothed wheels mesh under load during operation of the transmission stage, comparing the oscillation signal with a calibration oscillation signal, determining a torque acting on the transmission stage from a difference between the oscillation signal and the calibration oscillation signal, and evaluating the measured oscillation signal commensurate with the determined torque to identify the possible damage to the transmission stage.

16 Claims, 2 Drawing Sheets

METHOD FOR IDENTIFYING DAMAGE ON TRANSMISSIONS

CROSS-REFERENCES TO RELATED APPLICATIONS

This application claims the priority of European Patent Application, Serial No. 11174330.8, filed Jul. 18, 2011, pursuant to 35 U.S.C. 119(a)-(d), the content of which is incorporated herein by reference in its entirety as if fully set forth herein.

BACKGROUND OF THE INVENTION

The present invention relates to a method for identifying damage in toothed transmission stages having at least one pair of meshing toothed wheels and to an apparatus for identifying damage on toothed transmission stages.

The following discussion of related art is provided to assist the reader in understanding the advantages of the invention, and is not to be construed as an admission that this related art is prior art to this invention.

Transmissions are central components in a large number of industrial machines. During operation they are subject to a high level of stress and associated wear, leading to the possibility of damage occurring, which might result in impaired operation and in particular failure of the transmission and the machine as a whole. To minimize or prevent such failure due to damage and the associated financial losses, it is desirable to observe the operation of the transmission. In this context condition monitoring system CMS are used during ongoing operation to monitor whether a component, for example a transmission, operates in the required manner or whether there is a malfunction present or developing. The occurrence or imminence of damage can thus be identified early, so that suitable measures can be instituted to limit the damage locally or to eliminate it in a timely and efficient manner. It is thus possible to keep operating restrictions and stoppages of the machine to a minimum by identifying damage at an early stage.

At present, such condition monitoring systems are becoming increasingly important in the context of wind power energy generation, as the constant reliable operation of the wind power plant has to be ensured for a continuous power supply and is essential for economical operation of the system. Particular attention is paid here to monitoring the condition of the transmission, as the transmission of the wind power plant has the longest down times per damage incident of all the components of the wind power plants. The long downtime here is due to complex repair procedures and sometimes poor accessibility of the damaged components.

A condition monitoring or condition diagnosis system, as used in the field of wind power, generally includes monitoring the temperature of the system, monitoring the condition of the oil used in the system and oscillation monitoring. In the latter instance the oscillations associated with the operation of a component are monitored by means of suitable vibration transducers in order to be able thus to detect deviations from the normal operation of the wind power plant or its components, indicating the presence of damage. Current operating parameters such as speed or load are also monitored and recorded.

With the known methods condition monitoring generally takes place over quite a long period. To identify damage, the detected signals are compared with reference values, which were detected during a calibration measurement or obtained with the aid of simulation methods. Oscillation signatures can be cataloged, which were detected in the presence of damage and are then available for comparison with oscillation signatures that are detected in the future. However a reliable damage prognosis by comparison can only take place, if identical operating parameters prevailed during the detection of the cataloged oscillation signatures and the oscillation signatures with which these are compared.

However, highly variable wind speeds mean that a wind power plant is subject to a broad load spectrum and the operational parameters extend over a wide range. It is therefore generally not possible, or it is only possible with a high level of outlay, to store reference values for all possible operating states of the system. For this reason what is known as an envelope curve technique is used. This means that a minimum value and a maximum value are assigned in each instance to the reference signal, allowing the range of operational deviations to be estimated and defined. A deviation is then interpreted as being due to damage if the signal lies outside this reference window. However this is associated with inaccuracies and for reliable damage identification it is necessary to draw on the services of an expert who analyzes the detected signals and uses his/her experience to identify possible damage. This is considered disadvantageous, as the plurality of installed wind power plants in particular means that there are not enough experts available and their deployment for identifying damage is associated with high costs.

Efforts are therefore being made to improve the analysis of the data acquired as part of condition monitoring in respect of damage present. It is therefore necessary in particular for a reliable damage prognosis to separate the changes in the detected signals caused by a change in current operating parameters from the changes due to damage.

It would therefore be desirable and advantageous to obviate prior art shortcomings and to provide an improved method for damage identification, which allows reliable identification and prediction of damage on transmissions, so that damage can be identified automatically and economically.

SUMMARY OF THE INVENTION

According to one aspect of the present invention, a method for identifying possible damage in a toothed transmission stage having at least one pair of engagement toothed wheels includes the steps of measuring with at least one vibration transducer at least one first oscillation signal corresponding to oscillations produced by a rolling and impact motion when teeth of a first of the at least one pair of the toothed wheels mesh under load during operation of the transmission stage, comparing the at least one first oscillation signal with a first calibration oscillation signal, determining a torque acting on the transmission stage from a difference between the at least one first oscillation signal and the first calibration oscillation signal, and evaluating the at least one measured first oscillation signal commensurate with the determined torque to identify the possible damage to the transmission stage.

The invention is based on the understanding that meshing teeth of a toothed wheel pair are deformed when a load is present. The deformation here is a function of Hooke's law of applied force and the spring constant of the deformed component for linear elastic materials. In the case of toothed transmission stages, the tooth rigidity, together with the applied torque, thus determines the extent to which a deformation of the teeth takes place on meshing. According to the invention this association is used to determine the torque.

The deformation due to load of the meshing teeth causes the pattern of the tooth meshing to change. Such changes can be detected by vibration transducers. To this end, an oscillation signal is detected at the transmission, which corresponds to the oscillations produced by the rolling and impact motion when the teeth mesh under load. The detected oscillation signal is then compared with a calibration oscillation signal and the torque acting on the transmission is determined from the deviation of the oscillation signal from the calibration oscillation signal.

Damage can be identified when monitoring the condition of the transmission with vibration transducers, because deformations of the transmission components caused by wear and damage also produce a change in detected oscillation signals. To this end the detected oscillation signals are analyzed, for example, with respect of significant points and compared with reference values. Deviations due to damage in the form of peaks or edges in the oscillation signal can be present here. Peaks or edges in the signal caused by damage may also be displaced.

The inventive consideration of the torque acting on the transmission during signal analysis allows purely operational changes in the oscillation signals to be separated from changes due to damage. To this end, the detected oscillation signals may be normalized for example to the inventively determined torque through application of different known mathematical or function-dependent methods. This ensures reliable damage identification and prediction in a simple manner and thus also economical operation of the system comprising the transmission.

According to an advantageous feature of the present invention, an oscillation signal corresponding to a tooth meshing of a further pair of toothed wheels may be detected. The oscillation signal may then be compared with a calibration oscillation signal and the torque acting on the transmission is determined from the difference between the deviations of the two oscillation signals from the respective calibration oscillation signals. The torque is then taken into account when evaluating the oscillation signal in respect of possible damage.

According to an advantageous feature of the present invention, oscillation signals corresponding to two pairs of meshing toothed wheels provided at axially spaced locations on a shaft may be detected. This allows also taking into account the load-dependent deformation of the shaft for determining torque. Both the teeth of the toothed wheel pair and the section of the shaft between the two toothed wheel pairs can be subject to deformation under load. A determination of the difference between the deviations of the two oscillation signals corresponding to the tooth engagements from the respective calibration oscillation signals then also includes the load-related deformation of the shaft. Individual oscillation signals or even different oscillation signal components of a signal can correspond here to the two pairs of toothed wheels.

According to an advantageous feature of the present invention, an oscillation signal, which corresponds to the oscillations produced by the rolling and impact motion when the teeth of the at least one pair of toothed wheels mesh under known load and at a known speed, can be used as a calibration oscillation signal. In order to be able to determine the change in the detected oscillation signal due to the applied torque, the signal must generally be compared with a suitable reference. This can be established by recording an oscillation signal assigned to the tooth meshing under known load and at a known speed. It is also possible as part of a calibration measurement to determine a transmission function by means of which a discrete torque value is assigned to a discrete deviation of the oscillation signal. Calibration must generally take place for every transmission type. Known methods can be used here, as are applied for example on a transmission test bed.

According to another advantageous feature of the present invention, oscillation signals may be detected, which correspond to a number of tooth engagements at different locations in the transmission, the average value of the deviations of the oscillation signals from the calibration oscillation signals may formed and the average value may be used to determine the torque. By forming the average value, a more reliable measurement value can be determined in a known manner.

According to another advantageous feature of the present invention, the duration of the tooth meshing of the at least one pair of meshing toothed wheels may be determined from the oscillation signal and for the torque may be determined from the deviation of the pattern of the tooth meshing duration from a tooth meshing duration under known load and at a known speed. More particularly, the duration of the tooth meshing between the starting point of meshing A and the end point of meshing E and/or the duration of the tooth meshing between the starting point B of the individual meshing region and the end point D of the individual meshing region between two teeth may advantageously be determined as the tooth meshing duration.

According to another advantageous feature of the present invention, the detected oscillation signal may be analyzed in respect of the tooth meshing duration, wherein significant locations of tooth meshing may be identified, for example, in the form of peaks or edges in the oscillation signal. Load causes a characteristic change in the tooth meshing duration. The overall meshing duration, in other words the time between the starting point of meshing A and the end point of meshing E increases as the load increases, while the duration of the tooth meshing between the starting point B and the end point D of the individual meshing region decreases as the load increases. This characteristic response may be derived from the oscillation signals determined by means of vibration transducers and can be used according to the invention to determine the torque.

According to an advantageous feature of the present invention, the detected torque values may be continuously monitored and stored and an alarm signal may be outputted when one of the detected torque values is located outside a predetermined permissible torque value range. The torque values here are advantageously detected and stored with spatial resolution and the notification includes details of the impermissible torque values and details of the location where the torque value was detected in the transmission stage. This ensures that in the event of a significant torque deviation, notification takes place and it is ensured that the location in the transmission stage where this high value was detected can be identified. Individual torque values can also be compared with an average value formed over different transmission locations, in order to identify a local deviation from the average value.

According to an advantageous feature of the present invention, the at least one oscillation signal may be Fourier-transformed. With a Fourier transformation, for example, a time-dependent oscillation signal can be transformed into the frequency domain, allowing a frequency-dependent analysis of the signal to take place. Characteristic signal patterns such as peaks for discrete frequency values can then be identified in the frequency-dependent representation and correlated with operational values, for example the basic tooth meshing frequency. This results from the speed and number of teeth of the toothed wheel.

When the oscillation signal is represented in the frequency domain, a signal component that is present in a predetermined frequency range, in particular the component that extends around a predetermined frequency interval and the fundamental tooth meshing frequency can be filtered out from the oscillation. It is thus possible to isolate the frequency range required for the analysis, in order for example only to take into account the signal components of relevance for the torque determination.

According to an advantageous feature of the present invention, the fundamental tooth meshing frequency may be determined with the aid of a rotational speed counter. It is then possible from the current speed to calculate the basic tooth meshing frequency together with the known number of teeth on the toothed wheel.

According to an advantageous feature of the present invention, the oscillation signal may be detected with structure-borne sound transducers and/or air-borne sound transducers. Advantageously, the oscillation signal may be detected with vibration transducers of a condition monitoring system. Use of the existing vibration transducers of a condition monitoring system is particularly advantageous, since no additional components need to be installed on the transmission or on the system comprising the transmission in order to apply the inventive method.

According to another advantageous feature of the present invention, the temperature of the transmission and/or of the apparatus comprising the transmission may be monitored and also included in the evaluation of the oscillation signal in respect of possible damage. The condition of the transmission oil, in particular the viscosity and/or purity and/or moisture content and/or further characteristic values of the transmission oil may advantageously also be monitored and included in the evaluation of the oscillation signal in respect of possible damage. The detection of further operational parameters and their consideration in the analysis of the oscillation signals allow operational changes to be separated from changes due to damage. When a large number of operating parameters are detected, it is possible in particular to establish multi-parameter links by way of known mathematical methods, thereby allowing reliable damage identification and prediction.

Lastly, according to another aspect of the present invention, an apparatus for identifying damage in toothed transmission stages includes at least one vibration transducer and a control apparatus. The vibration transducer is configured to detect an oscillation signal which corresponds to the oscillations produced by the rolling and impact motion when the teeth of the at least one pair of toothed wheels mesh are under load, and the control apparatus is configured to identify damage on the toothed transmission stage using the aforedescribed method.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
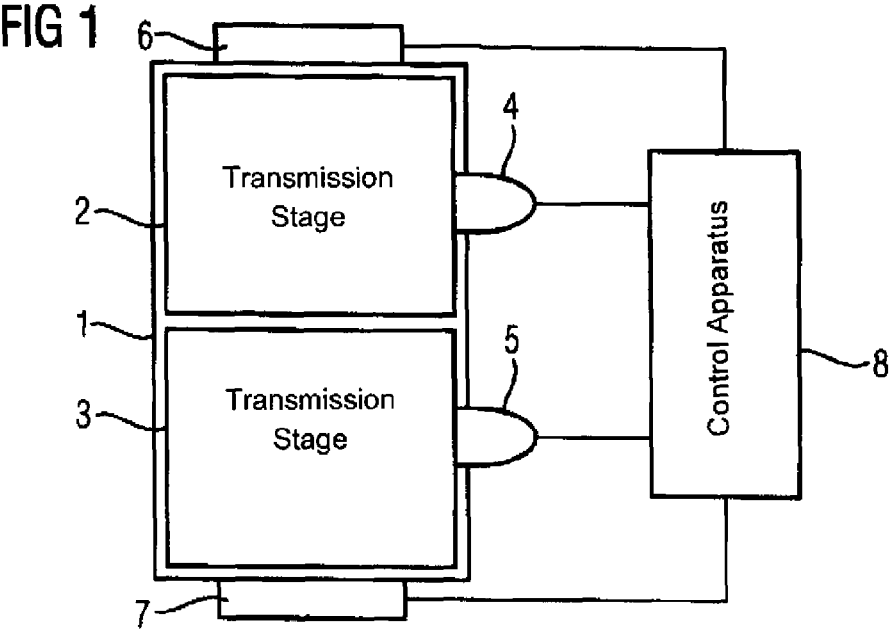
FIG. 1 shows a schematic diagram of a transmission.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a schematic diagram of a transmission 1, as used for example in wind power plants to convert the rotational movement of the rotor to a rotation of the drive shaft of a generator. The transmission 1 comprises two toothed transmission stages 2, 3, to each of which a vibration transducer 4, 5 and a rotational speed counter 6, 7 are respectively assigned. In the specifically illustrated exemplary embodiment the vibration transducers are structure-borne sound transducers 4, 5. However other sensors, for example air-borne sound transducers, can also be used. The structure-borne sound transducers 4, 5 here are an integral component of a condition monitoring system (not shown), used to monitor the transmission 1. Of the condition monitoring system only the central control apparatus 8 is shown here, to which the structure-borne sound-sound transducers 4, 5 and the rotational speed counters 6, 7 are connected.

During operation the acoustic oscillations produced by the meshing teeth of the toothed wheel pair of the first transmission stage 2 are recorded by means of the associated structure-borne sound transducer 4. When a load is present, the teeth of the toothed wheel pair are deformed, with the extent of the deformation being a function of tooth rigidity and the applied torque. The pattern of the tooth meshing changes as a result and this is detected. To this end the structure-borne sound transducer 4 detects an acoustic oscillation signal, which corresponds to the oscillations produced by the rolling and impact motion when the teeth of the toothed wheel pair mesh under load. The detected oscillation signal is then compared with a calibration oscillation signal and the torque acting on the transmission 1 is determined from the deviation of the oscillation signal from the calibration oscillation signal. According to the invention, the torque thus determined is taken into account when evaluating the oscillation signal in respect of possible damage.

Figure 2:
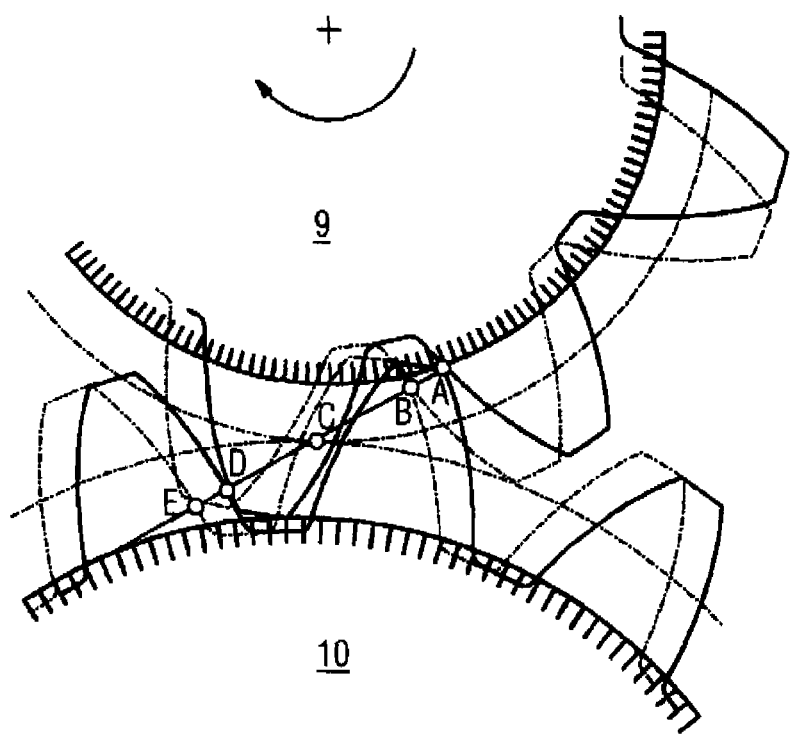
FIG. 2 shows a schematic diagram of a pair of meshing toothed wheels.

The duration of the tooth meshing of a pair of meshing toothed wheel 9, 10 specifically is determined from the oscillation signal and the torque is determined from the deviation of the pattern of the tooth meshing duration from a tooth meshing duration under known load and at known speed. The duration of the tooth meshing between the starting point of meshing A and the end point of meshing E, and/or the duration of the tooth meshing between the starting point B of the individual meshing region and the end point D of the individual meshing region between two teeth is/are determined here as the tooth meshing duration. For an illustration of the pattern of tooth meshing and the abovementioned characteristic locations of the same, see FIG. 2 which shows a schematic diagram of a pair of meshing toothed wheels 9, 10. The characteristic points A-E of the tooth meshing are also marked.

Figure 3:
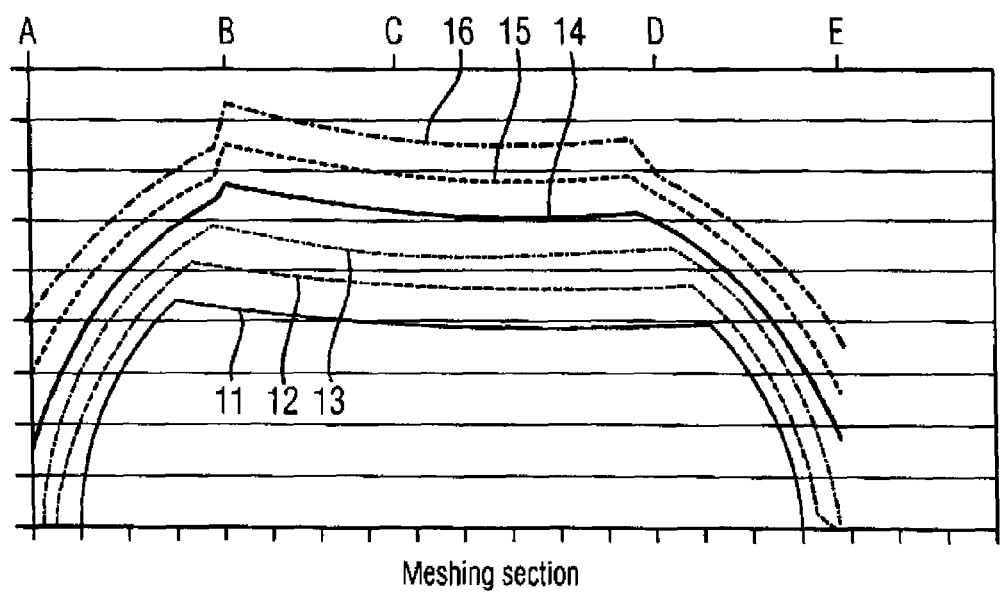
FIG. 3 shows a diagram, in which the compressions of the tooth edges are plotted over the meshing section for different applied torques, according to the present invention.

The significant locations of the tooth meshing can be identified, for example, in the form of peaks or edges in the oscillation signal. The load present causes the tooth meshing duration to change in a characteristic manner. The total meshing duration, in other words the time between the starting point of meshing A and the end point of meshing E increases as the load increases, while the duration of the tooth meshing between the starting point B and the end point D of the meshing region decreases as the load increases. This response is shown by FIG. 3, in which the compression of the tooth edges is shown over the meshing section for different loads. It is possible to derive the load-dependent migration of the tooth meshing impacts along the meshing section from FIG. 3. A total of six curves 11-16 are shown, corresponding to six torque values. The bottom curve 11 shows the compression over the meshing section for the smallest load and the top curve 16 shows the compression over the meshing section for the highest load. For the curves 12-15 in between, the load present increases continuously from bottom to top. It can be seen from the curve comparison that the overall meshing duration increases as the load increases, while the duration between the starting point B and the end point D of the individual meshing region decreases as the load increases. This change is detected by way of the oscillation signal detected by means of the structure-borne sound transducer 4 and is used according to the invention to determine the torque.

Since deformations of the transmission components due to wear and damage likewise produce a change in the detected oscillation signal, damage present on the transmission 1 can be identified by evaluating the oscillation signal. To this end the oscillation signal is analyzed in respect of significant locations and compared with reference values to identify possible damage. Deviations due to damage can be present in the form of peaks or edges in the oscillation signal or peaks or edges in the signal can be displaced due to damage. The inventive consideration of the torque acting on the transmission 1 in the context of the analysis of the signal to identify damage allows purely operational changes in the oscillation signal to be separated from changes due to damage. The oscillation signal is for example standardized to the inventive torque, with known mathematical or function-dependent methods being applied. This ensures reliable damage identification and prediction in a simple manner and thus economical operation of the system comprising the transmission 1.

An oscillation signal corresponding to the tooth meshing of a pair of toothed wheels 9, 10 of the second transmission stage 3 is also detected during operation by means of the further structure-borne sound transducer 5 and the oscillation signal is compared with a calibration oscillation signal. The torque acting on the transmission 1 is determined from the difference between the deviation of the two oscillation signals from the respective calibration oscillation signals. The shaft (not shown) between the toothed wheels 9, 10 of the first and second transmission stage is deformed when a load is applied and this shaft deformation can also be taken into account to determine the torque by detecting the oscillation signals corresponding to the toothed wheel pairs. As an alternative to using two independent structure-borne sound transducers 4, 5, it is also possible to provide a structure-borne sound transducer 4, 5 at just one location on the transmission to detect an oscillation signal, with different oscillation signal components then corresponding to the two pairs of toothed wheels 9, 10.

An oscillation signal, which corresponds to the oscillations produced by the rolling and impact motion when the teeth of the respective toothed wheel pair mesh under known load and at known speed, is used as a calibration oscillation signal. In order to be able to determine the change in the detected oscillation signal due to an applied torque, the oscillation signal must generally be compared with a reference. Such a reference is established for example by recording an oscillation signal assigned to the tooth meshing under known load and at known speed. It is also possible as part of a calibration measurement to determine a transmission function by means of which a discrete torque is assigned to a discrete deviation of the oscillation signal.

Oscillation signals corresponding to further tooth engagements at different locations in the transmission 1 can also be detected at further locations in the transmission 1 by means of structure-borne sound transducers 4, 5 (not shown in the drawing). The average value of the deviation of the oscillation signals from the calibration oscillation signals is then formed and the torque is determined from the average value.

During operation the inventively determined torque values are continuously monitored and stored in the central control apparatus 8 and an alarm signal is output, if one of the detected values lies outside a predetermined permissible torque value range. The torque values here are detected and stored with spatial resolution and the notification includes details of the non-permissible torque values and details of the site where it was detected in the transmission 1. Individual torque values can also be compared with an average value formed over different transmission locations, in order to identify a local deviation from the average value and to give notice of this by means of an alarm signal.

As part of the analysis a Fourier transformation of the detected oscillation signal can also take place. A for example time-dependent oscillation signal can thus be transformed into the frequency domain and a frequency-dependent analysis of the signal can take place. Characteristic signal patterns such as peaks for discrete frequency values are then found in the frequency-dependent representation and correlated with operational parameters, for example the basic tooth meshing frequency.

If the oscillation signal is represented in the frequency domain, it is possible to filter out from this a component present within a predetermined frequency range, in particular the component which extends around a predetermined frequency interval around the basic tooth meshing frequency. It can be advantageous as part of the analysis to isolate a required frequency range in this manner, in order for example only to be able to take into account the signal components of relevance for the torque determination.

The basic tooth meshing frequency is determined here with the aid of the rotational speed counters 6, 7, being calculated in each instance from the speed and known number of teeth on the toothed wheel 9, 10.

The temperature of the transmission 1 and of the apparatus comprising the transmission 1 is monitored by means of temperature sensors (not shown) and is also included in the evaluation of the oscillation signal in respect of possible damage. The condition of the transmission oil, in particular the viscosity, purity, moisture content and further characteristic values of the transmission oil, is also monitored and included in the evaluation. The detection of these further operational parameters and their consideration in the analysis of the oscillation signals allow the separation of operational changes from those caused by damage.

The detection of this plurality of operating parameters, in particular the consideration of the inventively determined torque, allows multi-parameter links to be established by way of mathematical methods and allows reliable damage identification and prediction.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A method for identifying possible damage in a toothed transmission stage having at least one pair of meshing toothed wheels, comprising the steps of:
   measuring with at least one vibration transducer at least one first oscillation signal corresponding to oscillations produced by a rolling and impact motion when teeth of a first of the at least one pair of the toothed wheels mesh under load during operation of the transmission stage,
   determining from the at least one first oscillation signal a tooth engagement duration of the at least one pair of meshing toothed wheels,
   determining a difference between a pattern of the tooth engagement duration in operation of the transmission stage and the tooth engagement duration under a known load and at a known speed,
   comparing the at least one first oscillation signal with a first calibration oscillation signal,
   the difference between a pattern of the tooth engagement duration in operation of the transmission stage and the tooth engagement duration under a known load and at a known speed, and
   evaluating the at least one measured first oscillation signal and the determined torque to identify the possible damage to the transmission stage.

2. The method of claim 1, wherein the tooth engagement duration is determined from at least one duration selected from a duration of the tooth engagement between a starting point of the tooth engagement and an end point of tooth engagement, and from a duration of the tooth engagement between a starting point of an individual engagement region and an end point of the individual engagement region between two teeth.

3. The method of claim 1, wherein the at least one first oscillation signal is Fourier transformed.

4. The method of claim 1, wherein the at least one first oscillation signal is recorded by a structure-borne sound transducer.

5. The method of claim 1, wherein the at least one first oscillation signal is recorded by an air-borne sound transducer.

6. The method of claim 1, wherein the at least one oscillation signal is detected by vibration transducers of a condition monitoring system.

7. The method of claim 1, further comprising the steps of:
   monitoring a temperature of the transmission stage or of an apparatus comprising the transmission stage, or both, and
   evaluating the at least one measured first oscillation signal commensurate with the monitored temperature to identify the possible damage to the transmission stage.

8. The method of claim 1, further comprising the steps of:
   monitoring a condition of transmission oil selected from viscosity, purity, moisture content and additional transmission oil characteristic values, and
   evaluating the at least one measured first oscillation signal commensurate with the monitored transmission oil condition to identify the possible damage to the transmission stage.

9. The method of claim 1, further comprising the steps of:
   continuously monitoring and storing the determined torque values, and
   outputting an alarm signal when one of the determined torque values is located outside a predetermined permissible torque value range.

10. The method of claim 9, wherein the torque values are measured and the outputted alarm signal includes a notification with details of the impermissible torque values and details of a location in the transmission stage where the impermissible torque values were detected.

11. The method of claim 1, further comprising the steps of:
    transforming the at least one first oscillation signal into a frequency domain, and
    filtered out within a predetermined frequency range about the at least one first oscillation signal a component located around a predetermined frequency interval around a fundamental tooth engagement frequency.

12. The method of claim 11, wherein the fundamental tooth engagement frequency is determined with the aid of a rotational speed counter.

13. The method of claim 1, further comprising the steps of:
    measuring at least one second oscillation signal corresponding to engagement of a second pair of toothed wheels,
    comparing the at least one second oscillation signal with a second calibration oscillation signal, and
    determining the torque acting on the transmission stage from a difference between the at least one first and second oscillation signals and the corresponding first and second calibration oscillation signals.

14. The method of claim 13, wherein the at least one first and second calibration oscillation signals correspond to oscillation signals produced by the rolling and impact motion when the corresponding first and second pairs of toothed wheels mesh under a known load and at a known speed.

15. The method of claim 13, further comprising the steps of:
    measuring the at least one first and second oscillation signals corresponding to a plurality of tooth engagements occurring at different locations in the transmission stage,
    forming an average value of the differences between of the first and second oscillation signals and the corresponding first and second calibration oscillation signals, and
    determining the torque from the average value.

16. An apparatus for identifying possible damage in toothed transmission stages, comprising:
    at least one vibration transducer configured to measure an oscillation signal corresponding to oscillations produced by a rolling and impact motion when teeth of at least one pair of the toothed wheels mesh under load during operation of the transmission stage, and
    a control apparatus configured to identify possible damage to the toothed transmission stage by
    determining from the oscillation signal a tooth engagement duration of the at least one pair of meshing toothed wheels,
    determining a difference between a pattern of the tooth engagement duration in operation of the transmission stage and the tooth engagement duration under a known load and at a known speed, comparing the oscillation signal measured with the at least one vibration transducer with a calibration oscillation signal, the difference between a pattern of the tooth engagement duration in operation of the transmission stage and the tooth engagement duration under a known load and at a known speed, and evaluating the measured oscillation signal and the determined torque to identify the possible damage to the transmission stage.

* * * * *